(12) United States Patent
Riccardi

(10) Patent No.: US 8,909,529 B2
(45) Date of Patent: *Dec. 9, 2014

(54) METHOD AND SYSTEM FOR AUTOMATICALLY DETECTING MORPHEMES IN A TASK CLASSIFICATION SYSTEM USING LATTICES

(71) Applicant: AT&T Intellectual Property II, L.P., Atlanta, GA (US)

(72) Inventor: Giuseppe Riccardi, Hoboken, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/081,234

(22) Filed: Nov. 15, 2013

(65) Prior Publication Data

US 2014/0074476 A1 Mar. 13, 2014

Related U.S. Application Data

(63) Continuation of application No. 13/784,086, filed on Mar. 4, 2013, now Pat. No. 8,612,212, which is a continuation of application No. 09/956,907, filed on Sep. 21, 2001, now Pat. No. 8,392,188, and a continuation-in-part of application No. 09/690,721, filed on Oct. 18, 2000, now Pat. No. 7,085,720, and a continuation-in-part of application No. 09/690,903, filed on Oct. 18, 2000, now Pat. No. 6,681,206.

(60) Provisional application No. 60/235,861, filed on Sep. 27, 2000, provisional application No. 60/163,838, filed on Nov. 5, 1999.

(51) Int. Cl.
*G10L 15/04* (2013.01)

(52) U.S. Cl.
USPC ............ 704/254; 704/243; 704/244; 704/255

(58) Field of Classification Search
USPC ......... 704/231, 235, 243–245, 250, 255, 257, 704/9, 254, 249
See application file for complete search history.

(56) References Cited

U.S. PATENT DOCUMENTS 4,777,600 A 10/1988 Saito et al.
4,827,521 A 5/1989 Bahl et al.

(Continued)

FOREIGN PATENT DOCUMENTS

WO WO 00/62193 10/2000

OTHER PUBLICATIONS

A.L. Gorin, "Processing of Semantic Information in Fluently Spoken Language", to appear in the Proceedings of the Int;\l Conf. on Spoken Language Processing (CSLP), Oct. 1996, AT&T Research. pp. 1-4.

(Continued)

*Primary Examiner* — Huyen X. Vo

(57) ABSTRACT

The invention concerns a method and corresponding system for building a phonotactic mode for domain independent speech recognition. The method may include recognizing phones from a user's input communication using a current phonotactic model, detecting morphemes (acoustic and/or non-acoustic) from the recognized phones, and outputting the detected morphemes for processing. The method also updates the phonotactic model with the detected morphemes and stores the new model in a database for use by the system during the next user interaction. The method may also include making task-type classification decisions based on the detected morphemes from the user's input communication.

20 Claims, 7 Drawing Sheets

(56) References Cited

U.S. PATENT DOCUMENTS

| | | | |
|---|---|---|---|
| 4,866,778 | A | 9/1989 | Baker |
| 4,882,759 | A | 11/1989 | Bahl et al. |
| 4,903,305 | A | 2/1990 | Gillick et al. |
| 5,005,127 | A | 4/1991 | Kugimiya et al. |
| 5,029,214 | A | 7/1991 | Hollander |
| 5,033,088 | A | 7/1991 | Shipman |
| 5,062,047 | A | 10/1991 | Tanaka et al. |
| 5,099,425 | A | 3/1992 | Yuji et al. |
| 5,210,689 | A | 5/1993 | Baker |
| 5,212,730 | A | 5/1993 | Wheatley et al. |
| 5,297,039 | A | 3/1994 | Kanaegami et al. |
| 5,323,316 | A | 6/1994 | Kadashevich et al. |
| 5,333,275 | A | 7/1994 | Wheatley et al. |
| 5,337,232 | A | 8/1994 | Sakai et al. |
| 5,357,596 | A | 10/1994 | Takebayashi et al. |
| 5,375,164 | A | 12/1994 | Jennings |
| 5,384,892 | A | 1/1995 | Strong |
| 5,390,272 | A | 2/1995 | Repta et al. |
| 5,434,906 | A | 7/1995 | Robinson et al. |
| 5,457,768 | A | 10/1995 | Tsuboi et al. |
| 5,500,920 | A | 3/1996 | Kupiec |
| 5,509,104 | A | 4/1996 | Lee et al. |
| 5,544,050 | A | 8/1996 | Abe et al. |
| 5,619,410 | A | 4/1997 | Emori et al. |
| 5,642,519 | A | 6/1997 | Martin |
| 5,651,095 | A | 7/1997 | Ogden |
| 5,659,731 | A | 8/1997 | Gustafson |
| 5,666,400 | A | 9/1997 | McAllister et al. |
| 5,675,707 | A | 10/1997 | Gorin et al. |
| 5,719,921 | A | 2/1998 | Vysotsky et al. |
| 5,724,481 | A | 3/1998 | Garberg et al. |
| 5,724,594 | A | 3/1998 | Pentheroudakis |
| 5,794,193 | A | 8/1998 | Gorin |
| 5,832,480 | A | 11/1998 | Byrd et al. |
| 5,839,106 | A | 11/1998 | Bellegarda |
| 5,860,063 | A | 1/1999 | Gorin et al. |
| 5,878,390 | A * | 3/1999 | Kawai et al. ............ 704/231 |
| 5,905,774 | A | 5/1999 | Tatchell et al. |
| 5,918,222 | A | 6/1999 | Fukui et al. |
| 5,960,447 | A | 9/1999 | Holt et al. |
| 5,983,180 | A | 11/1999 | Robinson |
| 6,006,186 | A | 12/1999 | Chen et al. |
| 6,021,384 | A | 2/2000 | Gorin et al. |
| 6,023,673 | A | 2/2000 | Bakis et al. |
| 6,044,337 | A | 3/2000 | Gorin et al. |
| 6,064,957 | A | 5/2000 | Brandow et al. |
| 6,138,085 | A | 10/2000 | Richardson et al. |
| 6,173,261 | B1 | 1/2001 | Arai et al. |
| 6,192,110 | B1 | 2/2001 | Abella et al. |
| 6,208,964 | B1 * | 3/2001 | Sabourin ............ 704/244 |
| 6,233,553 | B1 | 5/2001 | Contolini et al. |
| 6,243,683 | B1 | 6/2001 | Peters |
| 6,308,156 | B1 | 10/2001 | Barry et al. |
| 6,311,152 | B1 | 10/2001 | Bai et al. |
| 6,317,707 | B1 | 11/2001 | Bangalore et al. |
| 6,397,179 | B2 | 5/2002 | Crespo et al. |
| 6,601,026 | B2 | 7/2003 | Appelt et al. |
| 6,745,161 | B1 | 6/2004 | Arnold et al. |
| 6,879,956 | B1 | 4/2005 | Honda et al. |
| 6,895,377 | B2 | 5/2005 | Kroeker et al. |
| 6,941,266 | B1 | 9/2005 | Gorin et al. |
| 6,961,954 | B1 | 11/2005 | Maybury et al. |
| 7,082,578 | B1 | 7/2006 | Fishkin et al. |
| 7,085,720 | B1 | 8/2006 | Gorin et al. |
| 7,286,984 | B1 | 10/2007 | Gorin et al. |
| 7,440,897 | B1 | 10/2008 | Gorin et al. |
| 7,620,548 | B2 | 11/2009 | Gorin et al. |
| 8,010,361 | B2 | 8/2011 | Gorin et al. |
| 2004/0199375 | A1 | 10/2004 | Ehsani et al. |

OTHER PUBLICATIONS

A.L. Gorin et al., "Spoken Language Acquisition for Automated Call Routing in a Telephone Network", Proceedings 1993 IEEE Workshop on Automatic Speech Recognition, Dec. 12-15, 1993, pp. 99-100.

A.L. Gorin et al. "Spoken Dialog as a Feedback control System", ESCA Workshop on Spoken Dialogue Systems—Theories and Applications, Vigso, Denmark, May 30-Jun. 2, 1995, AT&T Bell Laboratories, pp. 173-175.

A.L. Gorin et al., "Spoken Language Acquisition for Automated Call Routing", ICSLP 94, 1994 International Conference of Spoken Language Processing, Sep. 18-22, 1994, Pacific Convention Plaza Yokohama, pp. 1483-1486.

A.L. Gorin et al., "On Automated Language Acquisition" J. Accoust. Soc. Am. 97(6) Jun. 1995, pp. 3441-3461.

A. L. Gorin et al., "An Experiment in Spoken Language Acquisition", IEEE Transactions on Speech and Audio Processing, vol. 2, No. 1, Par II, Jan. 1994, pp. 224-240.

A.L. Gorin et al., "Automated Call Routng in a Telecommunications Network", Proceedings, Second IEEE Workshop On Interactive Voice Technology for Telecommunications Applications, Sep. 26-27, 1994, pp. 137-140.

R. Cole et al., "The Challenge of Spoken Language Systems: I Research Direction for the Nineties", IEEE Transactions on Speech and Audio Processing; Jan. 1995, vol. 3, Issue 1, pp. 1-21.

L.G. Miller et al., "A Structured Network Architecture for Adaptive Language Acquisition", ICASSP '92: Acoustics, Speech & Signal Processing Conference; 1992, vol. 1, I-201-I-204.

A.L. Gorin et al., "On Adaptive Acquisition of Spoken Language", Neural Networks for Signal Processing, 1991; 1991, pp. 422-431.

Ponceleon et al., "Automatic Discovery of Salient Segments in Imperfect Speech Transcripts", CIKM '01, Atlanta, Georgia, Nov. 5-10, 2001.

A.L. Gorin et al., "How May I Help You?", AT&T Las Research, p. 1-2 and 4, as it was to appear in the Proc. of IVITA, Philadelphia, Oct. 1996.

Irene Langkilde et al., "Automatic Prediction of Problematic Human-Computer Dialogues in How May I Help You?", In Proceedings of the IEEE Workshop on Automatic Speech Recognition and Understanding, ASRUU99, pp. 1-4, 1999.

U.S. Appl. No. 09/699,494, "Method for Automated Task Classification and Routing", filed Oct. 31, 2000, by A. Gorin et al.

U.S. Appl. No. 09/699,495, "Automated Task Classification System", filed Oct. 31, 2000, by A. Gorin et al.

U.S. Appl. No. 09/699,496, "System and Method for Conducting Dialog with a User in an automatic Task Classification System", filed Oct. 31, 2000, by A. Gorin et al.

U.S. Appl. No. 09/712,192, "Method and System for Predicting Problematic Situations in Automated Dialog", filed Nov. 15, 2000, by A. Gorin et al.

A.L. Gorin et al. U.S. Appl. No. 10/158,082, "Method and System for Automatically Detecting Morphemes in a Task Classification System Using Lattices", filed May 31, 2002.

Aberdeen et al., "Mitre: Description of the Alembic system as used in MET", Proceedings of the TIPSTER 24-Month Workshop, pp. 461-462, 1996.

Abney, Steven, "Chunks and Dependencies: Bringing Processing Evidence to Bear on Syntax" University to Tubingen, Oct. 17, 1991.

Humphreys et al. University of Sheffield: Description of the LaSIE-II System as Used for MUC-7 In Proceedings of the Seventh Message Understanding Conferences, 1998.

Rahim et al. "Robust numeric recognition in spoken language dialogue", Speech Communication, vol. 34, 2001, pp. 195-212.

Huang et al. "Information extraction from voicemail", Association for computational Linguistics, Proceedings of the 39th Annual Meeting on Association for Computational Linguistics, Toulouse, France, 2001.

Bikel et al. "An Algorithm that learns what's in a Name", Machine Learning, vol. 34, pp. 211-231, Kluwer Academic Publishers, 1999.

Gotoh et al., "Named Entity Tagged Language Models," IEEE International Conference in Acoustics, Speech and Signal Processing, ICASSP '99, Mar. 15-19, 1999, pp. 513-516.

Gaizaaukas et al., "Description of the LaSIE system as used for MUC-6," In Processing of the Sixth Message Understanding Conference (MUC-6), pp. 207-220, Nov. 1995.

* cited by examiner

| DUR | WWT | | | |
|---|---|---|---|---|
| 7.75 | 0.0611 | K ao l | | Call |
| 10.00 | 0.0590 | n ah m B er | | Number |
| 9.15 | 0.0421 | f ao r | | Four |
| 14.57 | 0.0280 | y eh s | | Yes |
| 8.31 | 0.0370 | w ah n | | One |
| 10.66 | 0.0355 | s eh v ax n | | Seven |
| 20.00 | 0.0277 | K ao l ih ng K aa r D | | Calling Card |
| 9.83 | 0.0298 | T uw | | Two/To |
| 9.12 | 0.0227 | l ay K | | Like |

Fig. 6

METHOD AND SYSTEM FOR AUTOMATICALLY DETECTING MORPHEMES IN A TASK CLASSIFICATION SYSTEM USING LATTICES

This application is a continuation of U.S. patent application Ser. No. 09/956,907, filed Sep. 21, 2001, which is the non-provisional application claiming benefit of U.S. Patent Provisional Patent Application No. 60/235,861, filed Sep. 27, 2000, which is incorporated herein by reference in its entirety. The non-provisional application is also a continuation-in-part of U.S. patent application Ser. Nos. 09/690,721 and 09/690,903 (U.S. patent application Ser. No. 09/690,903 is now U.S. Pat. No. 6,681,206, issued Jan. 20, 2004) both flied Oct. 18, 2000, which claim the benefit of U.S. Provisional Application No. 60/163,838, filed Nov. 5, 1999, which are also incorporated herein by reference in their entireties.

TECHNICAL FIELD

The invention relates to automated systems for communication recognition and understanding.

BACKGROUND OF THE INVENTION

Conventional methods for constructing spoken language systems involve training speech and language models prior to operation by transcribing speech input and finding existing patterns. This speech is manually transcribed and each utterance is then semantically labeled. The resultant database is exploited to train stochastic language models for recognition and understanding. These models are further adapted for different dialog states. Examples of such methods are shown in U.S. Pat. Nos. 5,675,707, 5,860,063, 6,044,337, 6,173,261, 6,021,384 and 6,192,110, each of which is incorporated by reference herein in its entirety.

This transcription and labeling process is a major bottleneck in new application development and refinement of existing ones. For incremental training of a deployed natural spoken dialog system, current technology would potentially require transcribing millions of transactions. This process is both time-consuming and prohibitively expensive.

SUMMARY OF THE INVENTION

The invention concerns a method and corresponding system for building a phonotactic model for domain independent speech recognition. The method may include recognizing phones from a user's input communication using a current phonotactic model, detecting morphemes (acoustic and/or non-acoustic) from the recognized phones, and outputting the detected morphemes for processing. The method also updates the phonotactic model with the detected morphemes and stores the new model in a database for use by the system during the next user interaction. The method may also include making task-type classification decisions based on the detected morphemes from the user's input communication.

BRIEF DESCRIPTION OF THE DRAWINGS

The Invention is described in detail with reference to the following drawings wherein like numerals reference like elements, and wherein:

FIG. 6 is an exemplary excerpt from the set of acquired acoustic morphemes;

DETAILED DESCRIPTION OF THE PREFERRED EMBODIMENTS

Figure 1:
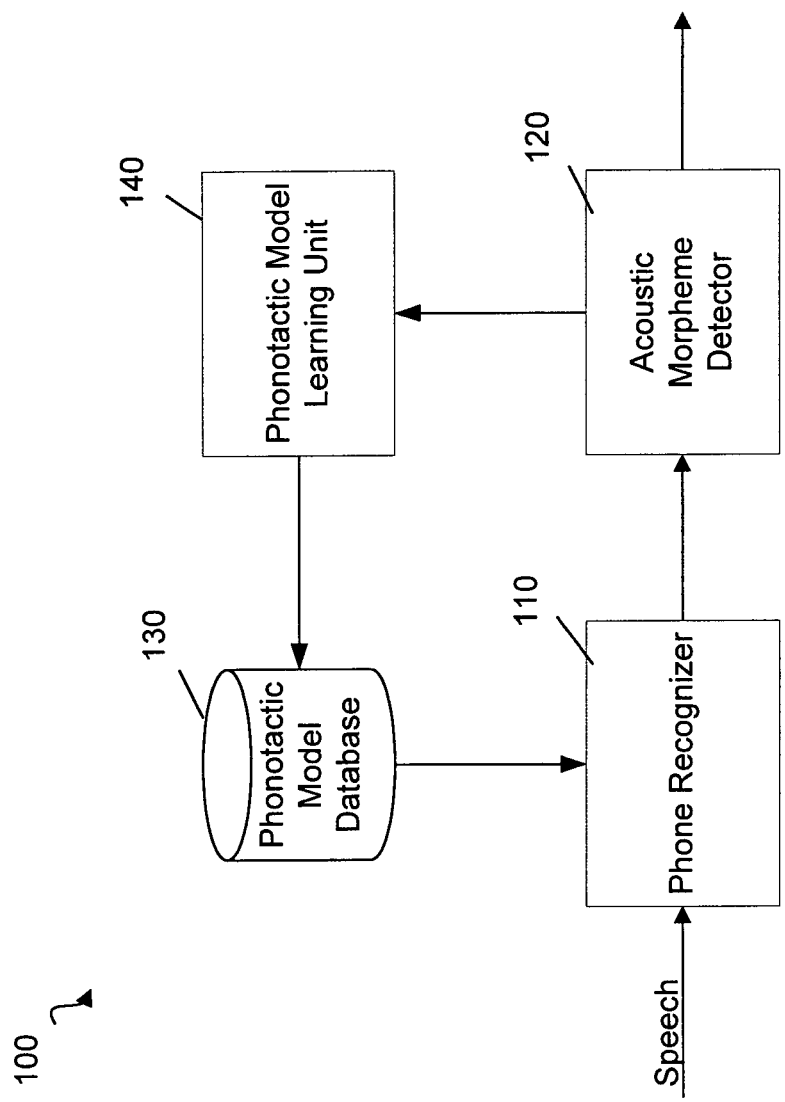
FIG. 1 is a block diagram of an exemplary speech recognition system of the invention.

Traditional ASR techniques require the domain-specific knowledge of acoustic, lexicon data and more importantly the word probability distributions. However, this invention concerns a method for unsupervised learning of acoustic and lexical units from out-of-domain speech data. The new lexical units are used for fast adaptation of language model probabilities to a new domain. Starting from a lexicon and language model, the relevant language statistics of task classification systems may be learned.

The invention concerns spoken language systems that adapts on-line to new domains. State-of-the art research or deployed spoken dialog systems perform constrained tasks (e.g., travel information, stock quotes, etc.) and they achieve high task completion rates. These systems are programmed to answer users' queries as long as they belong to the apriori defined domain. However, conventional spoken dialog system do not react to changes in the task (e.g., a new category for a call-routing task) and adapt to unseen speech and language events. The crucial features for such an adaptive system are the acoustic and lexical units.

The conventional large vocabulary speech recognition framework requires acoustic and language model to be trained on domain-specific data. This data is usually collected through human-to-machine interaction protocols and speech utterances are transcribed for the purpose of acoustic and language model training. These models perform poorly in out-of-domain conditions and are not suitable for on-line learning of language. This is true despite the fact that large vocabulary lexicons can have millions of words and reduce the out-of vocabulary rate to zero. However, the main reason for such poor performance is the mismatch of the language model probabilities.

An alternative approach to large vocabulary recognition is to model phone sequences. There has been active research on this topic and high phone recognition rates have been achieved for restricted domains and language. While it is widely accepted that phone recognition performance is inferior to word-based large vocabulary speech recognition tasks (where large databases are available to train language models), phone recognition allows a system to perform task-independent speech recognition. For these reasons, task-independent speech recognizers should combine the accuracy of a word-based system and the acoustic event granularity of a phone-based system.

Baseline approaches to the teaching of speech recognition systems are found in U.S. Pat. Nos. 5,675,707 and 5,860,063, 6,173,261, and 6,192,110, which have been incorporated above herein by reference in their entireties.

While the morphemes may be non-acoustic (i.e., made up of non-verbal sub-morphemes such as tablet strokes, gestures, body movements, etc.), for ease of discussion, the systems and methods illustrated in the drawings and discussed in the below concern only acoustic morphemes. Consequently, the invention should not be limited to just acoustic morphemes and should encompass the utilization of any sub-units of any known or future method of communication for the purposes of recognition and understanding.

Furthermore, while the terms "speech", "phrase" and "utterance", used throughout the description below, may connote only spoken language, it is important to note in the context of this invention, "speech", "phrase" and "utterance" may include verbal and/or non-verbal sub-units (or sub-morphemes). Therefore, "speech", "phrase" and "utterance" may comprise non-verbal sub-units, verbal sub-units or a combination of verbal and non-verbal sub-units within the sprit and scope of this invention.

Non-verbal speech may include but are not limited to gestures, body movements, head movements, non-responses, text, keyboard entries, keypad entries, mouse clicks, DTMF codes, pointers, stylus, cable set-top box entries, graphical user interface entries and touchscreen entries, or a combination thereof. Multimodal information is received using multiple channels (i.e., aural, visual, etc.). The user's input communication may also be derived from the verbal and non-verbal speech and the user's or the machine's environment. Basically, any manner of communication falls within the intended scope of the invention. However, for ease of discussion, we will focus on verbal speech in the examples and embodiments set forth below.

FIG. 1 is an exemplary block diagram of an exemplary speech recognition and understanding system 100 that utilizes acoustic morphemes. The speech recognition and understanding system 100 may include a phone recognizer 110, an acoustic morpheme detector 120, a phonotactic model learning unit 140, and a phonotactic database 130.

In the speech recognition and understanding system 100, the phone recognizer 110 may receive an input communications, such as speech, from a user, customer, etc., in the form of verbal and/or non-verbal speech. As discussed above, the input speech may, of course, be expressed in verbal speech, non-verbal speech, multimodal forms, or using a mix of verbal and non-verbal speech.

The phone recognizer 110 is the task-independent component of the speech recognition and understanding system 100 which transcribes speech utterances from one domain and is trained on another domain. Prior to being integrated in the system 100, the phone recognizer 110 may be initially trained from an off-the-shelf database, for example. The database may be generated from recordings of users talking with human agents, responding to the prompt "AT&T, How may I help you?" (HMIHY). The characteristics of this data and early experiments are detailed in U.S. Pat. No. 5,675,707, for example, which has been incorporated herein by reference in its entirety. In any event, the phone recognizer 110 may be of any known design and performs the function of recognizing, or spotting, the existence of one or more phone in the user's input speech.

In an embodiment for recognizing non-acoustic morphemes, the phone recognizer 110 may be replaced in the figure by a sub-morpheme recognizer. The sub-morpheme recognizer would operate similar to the phone recognizer 110, but it would receive raw non-acoustic or a mixture of acoustic and non-acoustic speech from the user. Again, although the invention encompasses non-acoustic speech, for ease of discussion, only acoustic morphemes will be discussed in reference to the figures.

Figure 2:
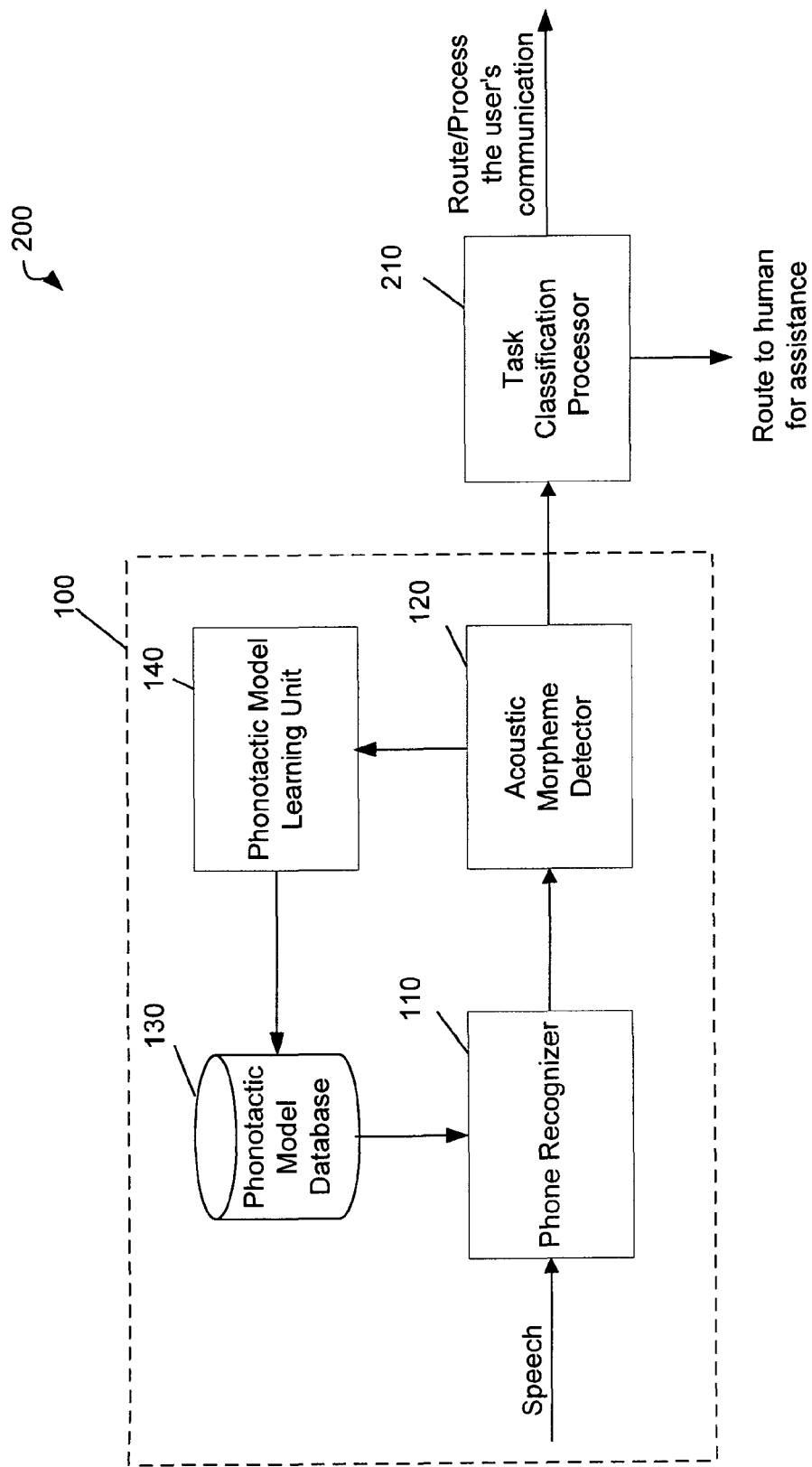
FIG. 2 is a block diagram of an exemplary speech recognition system of the invention used in conjunction with a task classification system.

The acoustic morpheme detector 120 detects the acoustic morphemes present in the recognized phones from user's input request. The acoustic morphemes detected by acoustic morpheme defector 120 may be used for processing by any number of automated systems known to those of ordinary skill in the art. For example, the acoustic morphemes detected by the acoustic morpheme detector 120 may include a large number of verbal and non-verbal speech fragments or sub-morphemes (illustrated as phone-phrases for ease of discussion), each of which may be related to one of a predetermined set of task objectives. In this respect, each of the acoustic morphemes may be labeled with its associated task objective. FIG. 2 shows an example of one such task classification system 200, as discussed below.

The acoustic morphemes defected by the acoustic morpheme detector 120 are also provided to the phonotactic model learning unit 140 for building a new phonotactic model. The phonotactic model learning unit 140 generates a new phonotactic model based on the detected acoustic morphemes found in the recognized phones from the user's input speech. The newly generated phonotactic model is then stored in the phonotactic model database 130 for use by the phone recognizer 110.

FIG. 2 shows the use of detected acoustic morphemes resulting from the automatically generated phontotactic model in a task classification system 200. The task classification system 200 may include a task classification processor 210 along with the same elements as the speech recognition and understanding system 100. The task classification processor 210 may apply a confidence function, based on the probabilistic relation between the recognized acoustic morphemes and selected task objectives, and makes a decision either to implement a particular task objective, or makes a determination that no decision is likely in which case the user may be defaulted to a human or automated system for assistance. Within this framework, on-line estimates of word or morpheme probabilities are learned for task-independent speech recognition. In fact, a classifier that operates on words, morphemes (acoustic and non-acoustic), and/or sub-morphemes, etc., may be used within the spirit and scope of the invention.

Figure 3:
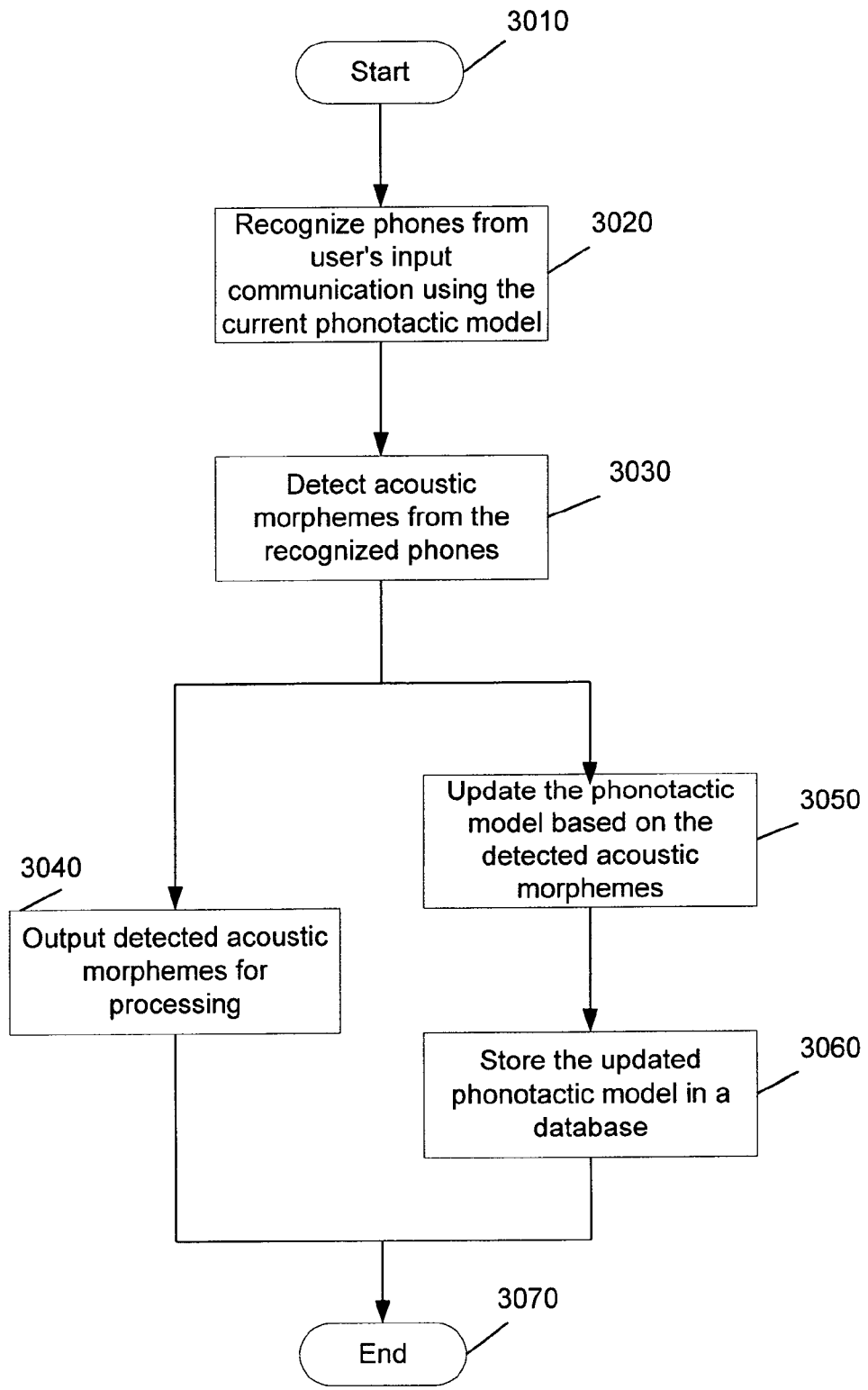
FIG. 3 is a flowchart illustrating an exemplary phonotactic model updating process.

An exemplary process of the invention will now be described in FIGS. 3-5 with reference to the exemplary structure shown in FIGS. 1 and 2. FIG. 3 illustrates a possible process of automatically building a phonotactic model using acoustic morphemes for use in the speech recognition and understanding system 100. The process begins at step 3010 and proceeds to step 3020 where the phone recognizer 110 receives raw speech from a user and recognizes phones in the speech using the current phonotactic model stored in the phonotactic model database 130. In the phonotactic model, each word in the speech corpus is replaced with its most likely pronunciation and trained n-gram model based on the Variable N-gram Stochastic Automaton (VNSA).

The acoustic morpheme detector 120 may detect phone sequences by computing information theoretic measures, such as the weighted mutual information $I_w(x,y)=P(x,y)MI(x,y)=P(x,y)\log P(x,y)/P(x)P(y)$, where x and y are two phone sequences. Weighted mutual information compensates for probability estimates biases introduced by rare events in the mutual information, $MI(x,y)$. Alternative and computationally expensive methods for computing acoustic morphemes are entropy-minimizing units and multi-gram approaches. It can be shown both theoretically and experimentally that the n-best $I_w$ is a close approximation of the exact entropy minimization problem. Such methods are shown in U.S. Pat. No. 6,021,384, which has been incorporated by reference above.

Excerpts from the detected acoustic morphemes are shown in FIG. 6. The first and second column contain the $I_w$ and MI values, the third and fourth are the corresponding acoustic morpheme sequence and its most likely word sequence. The phonotactic model learning unit 140 may for example, incorporate the top N (N=500) acoustic morphemes in the stochastic phonotactic models which takes advantage of the long-spanning acoustic morphemes.

After the acoustic morphemes have been detected, the process proceeds on a dual track of processing and training. In the processing track, in step 3040, the acoustic morphemes are output for processing. One of the possible processes for detected acoustic morphemes may be to the map them into word sequences using a lexical access unit. In general, this process is not needed if the semantic units are not based on words. However, word-based language models are the natural candidates for cross-domain modeling, given the large availability of transcribed speech databases and the effectiveness word-based large vocabulary speech recognition.

Acoustic morphemes can be mapped to zero, one or many word sequences, for a given baseform lexicon. A conservative strategy to lexical access may be taken which considers only the exact match between baseforms in the lexicon and acoustic morphemes. This conservative strategy is dictated by the need to learn the most relevant lexical features of the domain with high precision and high rejection. These lexical features may be used to adapt on-line an off-the-shelf large vocabulary language model. The acquisition algorithm discussed above has selected 500 units that were matched against their most likely word mapping drawn from the lexicon. For example, in FIG. 6, a list of words and phrases was compiled. While the list of lexical items is short, due to the conservative strategy, they cover 40% of the probability mass of the speech corpus.

Figure 4:
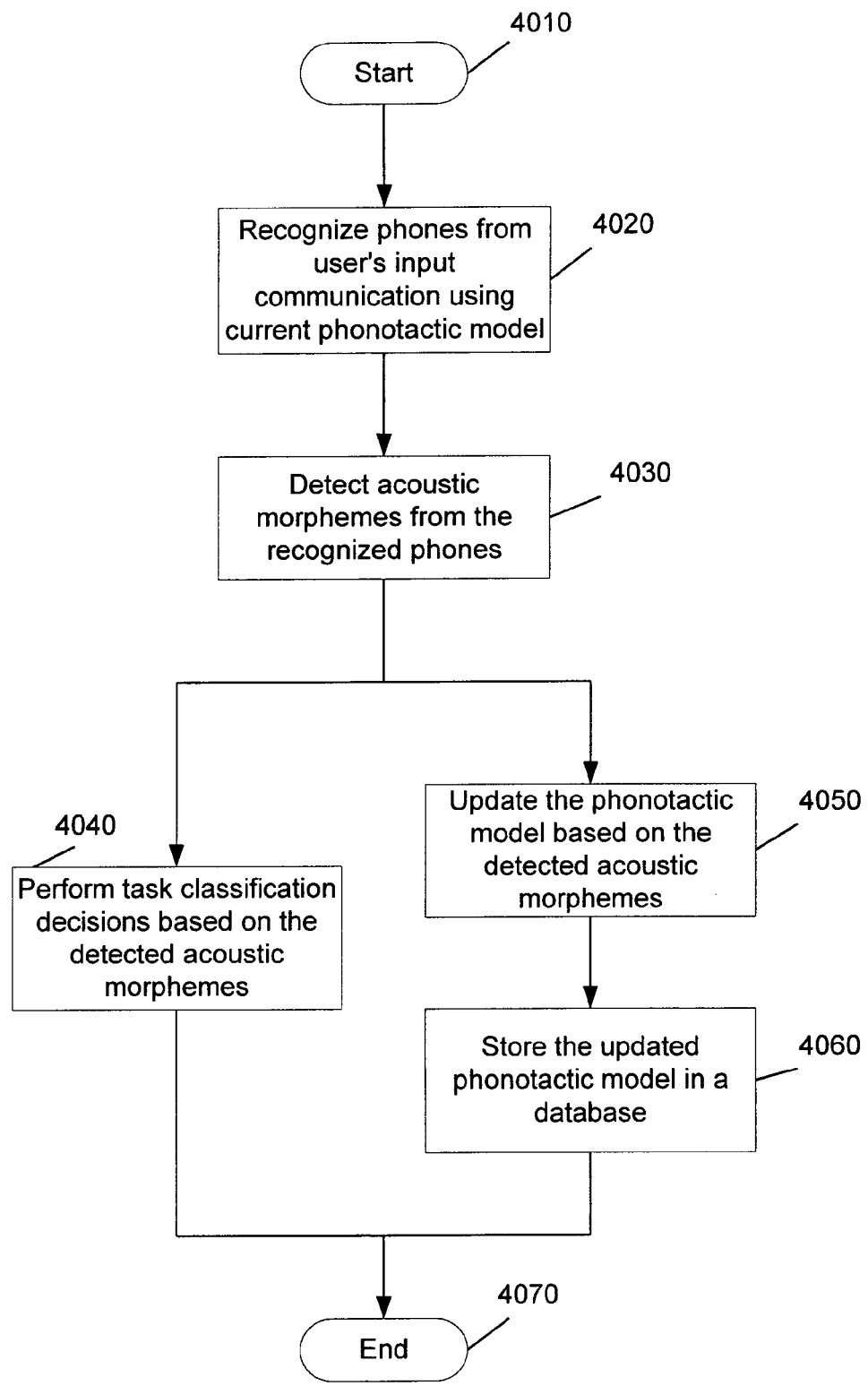
FIG. 4 is a flowchart illustrating an exemplary phonotactic model updating process in a task classification system.

Alternatively, the defected acoustic morphemes may be used by a task classification system 200 from FIG. 2, as depicted in the exemplary flowchart shown in FIG. 4. FIG. 4 includes steps 4010, 4020, 4030, 4050, 4060 and 4070 that correspond to steps 3010, 3020, 3030, 3050, 3060 and 3070 of FIG. 3. However, FIG. 4 also includes step 4040 where the task classification processor 210 makes task classification decisions based on the detected acoustic morphemes.

Figure 5:
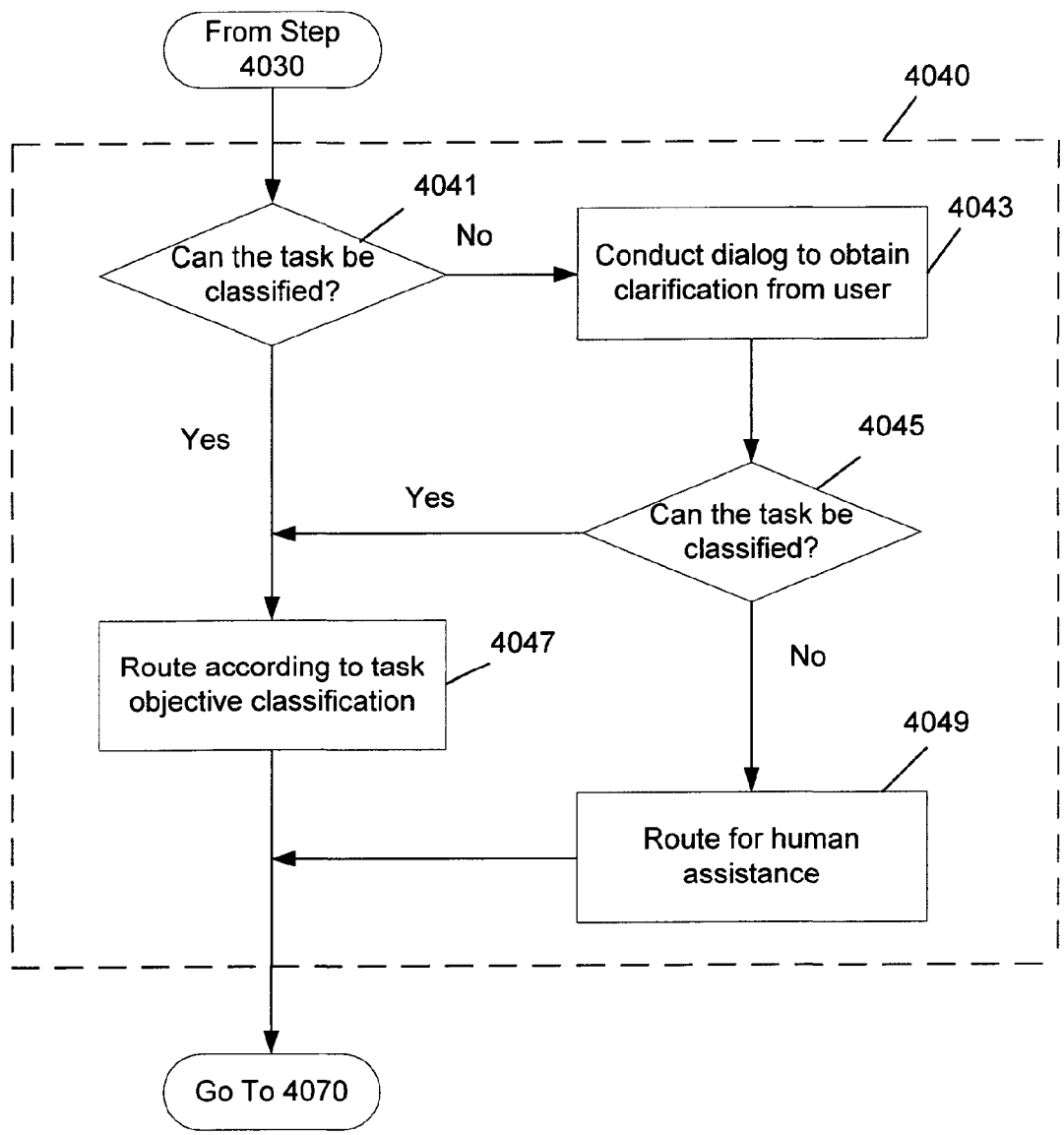
FIG. 5 is a detailed flowchart of the exemplary task classification process shown in FIG. 4.

As an example of processes that may be performed as part of a possible task classification process using acoustic morphemes, FIG. 5 is provided. In FIG. 5, from step 4030 where acoustic morphemes are detected from recognized phones from a user's input communication, the process proceeds to step 4040 and sub-steps 4041-4049 in which the task classification processor 210 performs task classifications based on the defected acoustic morphemes. The task classification processor 210 may apply a confidence function based on the probabilistic relation between the recognized acoustic morphemes and selected task objectives, for example.

In step 4041, the task classification processor 210 determines whether a task can be classified based on the detected acoustic morpheme. If the task can be classified, in step 4047, the task classification processor 210 routes the user/customer according to the classified task objective. The process then goes to step 4070 and ends.

If the task cannot be classified in step 4041 (i.e. a low confidence level has been generated), in step 4043, a dialog module (located internally or externally) the task classification processor 210 conducts dialog with the user/customer to obtain clarification of the task objective. After dialog has been conducted with the user/customer, in step 4045, the task classification processor 210 determines whether the task can now be classified based on the additional dialog. If the task can be classified, the process proceeds to step 4047 and the user/customer is routed in accordance with the classified task objective and the process ends at step 4070. However, if task can still not be classified, in step 4049, the user/customer is routed to a human for assistance and then the process goes to step 4070 and ends.

Referring back to FIG. 3, after the acoustic morphemes have been detected in step 3030, they may be used in a processed for building a phonotactic model using the phonotactic model learning unit 140 for ultimate use by the phone recognizer 110 in recognizing phone sequences in the user's next utterance. In building the phonotactic model, the phonotactic learning unit 140 transforms a prior probability distribution from one domain to another without speech transcriptions (on-line adaptation). This is the primary constraint of an adaptive spoken dialog system, which can react and recover to novel events is the syntactic and semantic input channel. Most of the literature in language model adaptation is for batch processing (with speech transcriptions) and assumes that the probability space is the same both for the source and target domain, namely the word sequence space.

The building of the phonotactic model by the phohtactic model learning unit 140 according to the invention involves at least two stochastic modeling processes. The first is to map phone sequence statistics into word statistics. If the most likely pronunciation of the word collect is K ae I eh K t, then $P(collect) \neq P(K\ ae\ I\ eh\ K\ t)$. In general terms:

$$P_{on\text{-}line}(\omega) = \sum_{f_i \in B_\omega} P(f_i)$$

where $f_I$ is a baseform of the word ω drawn from the set $B_\omega$. It is assumed from here forward that $P_{on\text{-}line}(\omega) \approx P(f_I)$, where $f_I$ is the most likely pronunciation.

Figure 7:
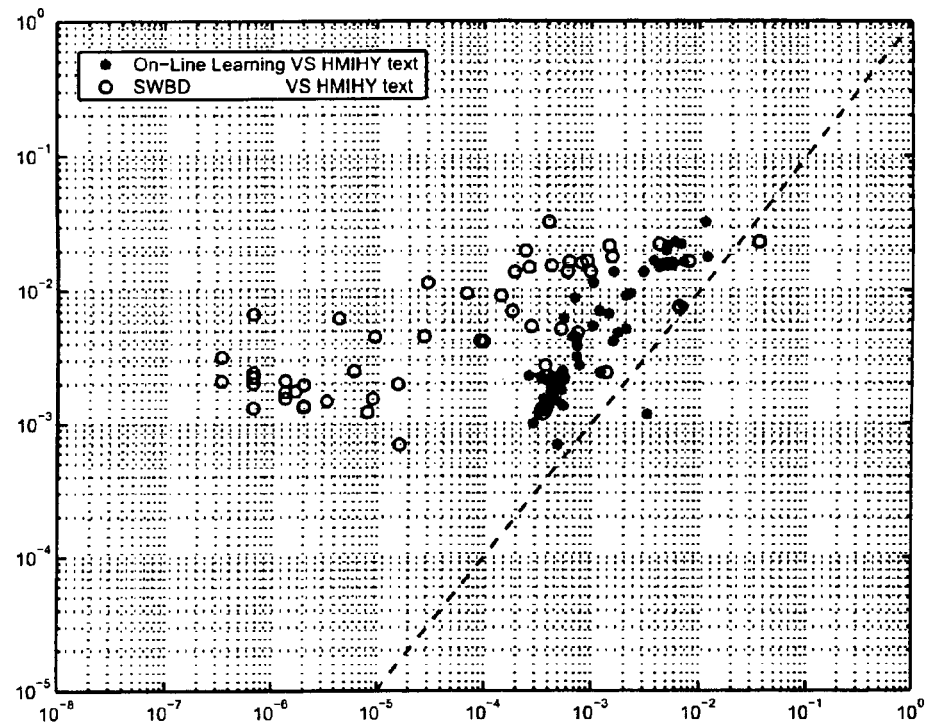
FIG. 7 is a graph illustrating the on-line learning experimental results as compared to the estimates from text transcriptions.

FIG. 7 is a scatter plot $(\log P_{HMIHY}(\omega), \log P_{on\text{-}line}(\omega))$(asterisk) and $(\log P_{HMIHY}(\omega), \log P_{switchboard}(\omega))$ (circle), where both $P_{HMIHY}(\omega)$ and $P_{switchboard}(\omega)$ have been estimated from the hand-labeled speech transcriptions. Most word probability estimates lie along the diagonal (dashed line) and closely approximate the true empirical distribution $P_{HMIHY}(\omega)$. In order to get an upper bound on the on-line probability estimates the phone sequence with lowest string edit distance from the reference phone transcription was computed. Thus, we have compiled the oracle phone transcription training set and estimated $P_{oracle\ online}(\omega)$.

Figure 8:
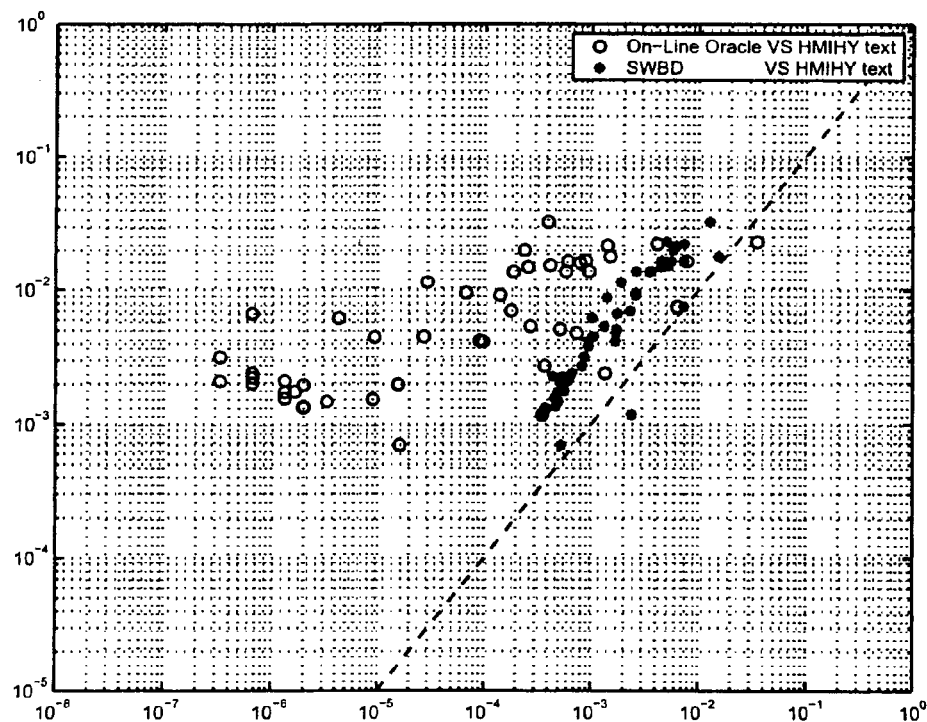
FIG. 8 is a graph illustrating the on-line oracle experimental results as compared to the estimates from text transcriptions.

FIG. 8 is a scatter plot of the log-probabilities for the on-line oracle estimates. From FIG. 8 we see that the probabilities of the selected words and phrases have been estimated with high precision with respect to the best possible guess (oracle).

The second problem is to transform the word probability vector of the prior distribution using the word statistics learned on-line. Given the small lexical coverage and large probability mass of the acquired features the two distributions have been merged with following scheme:

$$P_{target}(\omega) = \begin{cases} P_{on\text{-}line}(\omega) & w \in S \\ \underline{1-\alpha}\ P_{switchboard}(\omega) & w \in S \\ \beta \end{cases}$$

where:

$\alpha = \Sigma_{W \in S} P_{on\text{-}line}(\omega)$, $\beta = \Sigma_{W \in S}, \Sigma_{W \in V} P(\omega)$ and S is the sec of selected words. This model has been tested to measure the perplexity of the HMIHY test set perplexity for a unigram model. The unigram perplexity on the HMIHY test set, in matched language model condition ($P_{HMIHY}(\omega)$) is 128.3. The test perplexity using the switchboard language model ($P_{switchboard}(\omega)$) is 715.9. The test set perplexity was tested with the new word probability $P_{target}(\omega)$ and achieved a 39.4% relative improvement (433.9) with respect to the switchboard baseline.

Once the new phonotactic model is built, in step 3060 is stored in the phonotactic model database 130 for use by the phone recognizer 110 during the user's next utterance or interaction. The database 130 may be any mechanism, memory, file etc. capable of storing information and data known to those of skill in the art.

As shown in FIGS. 1 and 2, the method of this invention may be implemented using a programmed processor. However, method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device on which the finite state machine capable of implementing the flowcharts shown in FIGS. 3-5 can be used to implement the speech recognition and understanding system functions of this invention.

While the invention has been described with reference to the above embodiments, it is to be understood that these embodiments are purely exemplary in nature. Thus, the invention is not restricted to the particular forms shown in the foregoing embodiments. Various modifications and alterations can be made thereto without departing from the spirit and scope of the invention.

What is claimed is:

1. A method comprising:
   recognizing phonemes from a user input using a current phonotactic model stored in a database, to yield recognized phonemes;
   creating, via a processor, a new phonotactic model by transforming, using morphemes detected from the recognized phonemes, a prior probability distribution associated with a first domain to a prior probability distribution associated with a second domain; and
   replacing the current phonotactic model with the new phonotactic model in the database.

2. The method of claim 1, wherein the recognized phonemes are from one of verbal speech and non-verbal speech.

3. The method of claim 2, wherein the non-verbal speech comprises using one of a gesture, a body movement, a head movement, a non-response, text, a keyboard entry, a keypad entry, a mouse click, a dual-tone machine frequency code, a pointer, a stylus, a graphical user interface, and a touchscreen entry.

4. The method of claim 2, wherein the user input further comprises an environment of the user.

5. The method of claim 1, wherein the morphemes are expressed in multimodal form.

6. The method of claim 1, wherein the morphemes in the user input are derived from an action of the user.

7. The method of claim 6, wherein the action of the user comprises a focus of attention of the user.

8. The method of claim 1, operating in conjunction with one of a telephone network, Internet, an intranet, a cable television network, a local area network, and a wireless communication network.

9. The method of claim 1, wherein the method is used for customer care purposes.

10. The method of claim 1, wherein the morphemes are detected using a measure of commonality within a language of the morphemes.

11. The method of claim 1, wherein the detecting of the morphemes comprises using a confidence function.

12. The method of claim 1, wherein the new phonotactic model is used when recognizing phonemes for a future input from the user.

13. A system comprising:
   a processor; and
   a computer-readable storage medium having instructions stored which, when executed by the processor, cause the processor to perform operations comprising:
   recognizing phonemes from a user input using a current phonotactic model stored in a database, to yield recognized phonemes;
   creating a new phonotactic model by transforming, using morphemes detected from the recognized phonemes, a prior probability distribution associated with a first domain to a prior probability distribution associated with a second domain; and
   replacing the current phonotactic model with the new phonotactic model in the database.

14. The system of claim 13, wherein the recognized phonemes are from one of verbal speech and non-verbal speech.

15. The system of claim 14, wherein the non-verbal speech comprises using one of a gesture, a body movement, a head movement, a non-response, text, a keyboard entry, a keypad entry, a mouse click, a dual-tone machine frequency code, a pointer, a stylus, a graphical user interface, and a touchscreen entry.

16. The system of claim 14, wherein the user input further comprises an environment of the user.

17. The system of claim 13, wherein the morphemes are expressed in multimodal form.

18. The system of claim 13, wherein the morphemes in the user input are derived from an action of the user.

19. The system of claim 18, wherein the action of the user comprises a focus of attention of the user.

20. A computer-readable storage device having instructions stored which, when executed by a computing device, cause the computing device to perform operations comprising:
   recognizing phonemes from a user input using a current phonotactic model stored in a database, to yield recognized phonemes;
   creating a new phonotactic model by transforming, using morphemes detected from the recognized phonemes, a prior probability distribution associated with a first domain to a prior probability distribution associated with a second domain; and
   replacing the current phonotactic model with the new phonotactic model in the database.

* * * * *